E. EVES.
Vehicle-Spring Support.
No. 97,370.
Patented Nov. 30, 1869.
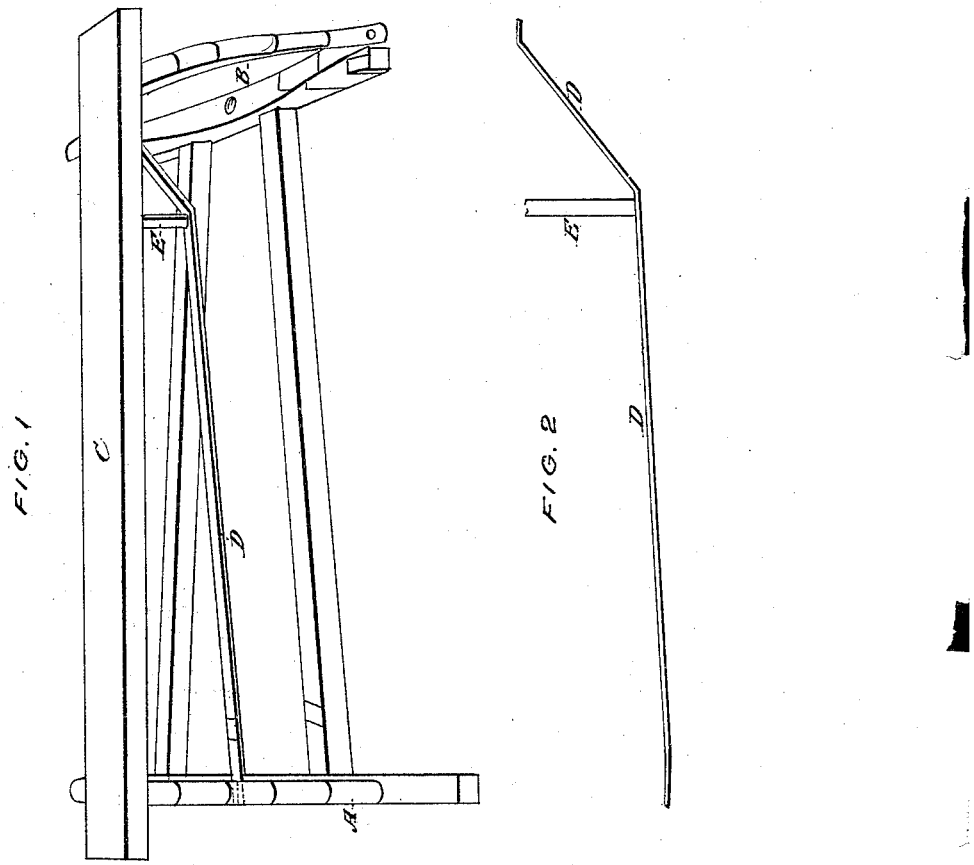
WITNESSES:
Harry King
C. L. Everts
INVENTOR:
Elias Eves.
per
Alexander Mason
attys.

United States Patent Office.

ELLIS EVES, OF MILLVILLE, PENNSYLVANIA.

Letters Patent No. 97,370, dated November 30, 1869.

IMPROVED SUPPORT FOR ELLIPTIC SPRINGS.

The Schedule referred to in these Letters Patent and making part of the same.

*To all whom it may concern:*

Be it known that I, ELLIS EVES, of Millville, in the county of Columbia, and in the State of Pennsylvania, have invented certain new and useful Improvements in Spring-Vehicles; and do hereby declare that the following is a full, clear, and exact description thereof, reference being had to the accompanying drawings, and to the letters of reference marked thereon, making a part of this specification.

The nature of my invention consists in the arrangement of a rod on a spring-vehicle, connecting the front and hind spring, so as to prevent the springs from jamming forward when drawn into a chuck-hole or downhill, or by the operation of a lock when attached to the bed.

In order to enable others skilled in the art to which my invention appertains, to make and use the same, I will now proceed to describe its construction and operation, referring to the annexed drawings, in which—

Figure 1 is a perspective view, showing the manner of connecting the front and hind springs, and Figure 2 is a side view of the connecting-rod.

A represents the hind part of the wagon;

B, the front part; and

C, a portion of the bed.

D represents a rod attached to the hind part A of the wagon, either the reach, or axle, or under part of the hind spring, then passes forward and is attached to a standard, E, projecting downward from the under side of the bed C.

The front end of the rod D is then attached to the bed, at the front end B or the front spring-bar, or the upper part of the front spring, said rod being made of steel, iron, wood, or any other suitable material.

By this arrangement the springs are prevented from jamming forward at any time.

Having thus fully described my invention,

What I claim as new, and desire to secure by Letters Patent, is—

The combination of the extended rod D, bent in an oblique manner at its front, and the post E, with the springs A B, and wagon-bottom C, all substantially as shown and described.

In testimony that I claim the foregoing, I have hereunto set my hand, this 30th day of August, 1869.

ELLIS EVES.

Witnesses:
TILLMAN STADLER,
JOHN EVES.